United States Patent
Tatebayashi (10) Patent No.: US 6,654,883 B1
(45) Date of Patent: Nov. 25, 2003

(54) DEVICE AUTHENTICATION AND ENCRYPTED COMMUNICATION SYSTEM OFFERING INCREASED SECURITY

(75) Inventor: Makoto Tatebayashi, Takarazuka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/257,319

(22) Filed: Feb. 25, 1999

(30) Foreign Application Priority Data

Feb. 25, 1998 (JP) .......................................... 10-043230

(51) Int. Cl.[7] .............................. H04L 9/00; H04L 9/30
(52) U.S. Cl. ...................... 713/168; 713/156; 713/171; 713/170; 713/176; 380/46; 380/30; 380/282; 705/67; 705/72
(58) Field of Search ................................ 713/156, 170, 713/171, 176, 168; 705/67, 72; 380/282, 46, 30

(56) References Cited

U.S. PATENT DOCUMENTS

| 4,963,723 A | * | 10/1990 | Masada | 235/384 |
| 5,086,389 A | * | 2/1992 | Hassett et al. | 364/401 |
| 5,310,999 A | * | 5/1994 | Claus et al. | 235/384 |

FOREIGN PATENT DOCUMENTS

EP 639907 2/1995

OTHER PUBLICATIONS

Horster et al.; "Authenticated Encryption Schemes With Low Communication Costs" Electronics Letters, Jul. 21st, 1994, vol. 30, No. 15.*
Schnier, "Applied cryptography", pp. 56–65, Wiley, 1996.
Schnier, "Applied cryptography", pp. 480–481, Wiley, 1996.
Vehicular Implementations of Public Key Cryptography Techniques, by B. Arazi,, IEEE Transactions on Vehicular Technology, 40 (1991) Aug., No. 3.

* cited by examiner

Primary Examiner—Gilberto Barron
Assistant Examiner—Paul E. Callahan (57) ABSTRACT

A system composed of a plurality of user devices, each storing unique secret information, a system device and a control unit. The control unit produces key capsule data by performing a digital signature conversion with message recovery on the unique secret information for each user device and distributes the unique secret information to the user devices. When device authentication and encrypted communication is performed, each user device transmits the key capsule data distributed by the control unit to the system device. The system device receives the data and recovers the unique secret information from the key capsule data by a digital signature verification conversion with message recovery, which uses the verification key distributed in advance by the control unit. Thus, the user device and the system device can share unique secret information and, using it as a key, perform device authentication and encrypted communication by performing encryption and decryption based on a secret key encryption algorithm.

10 Claims, 3 Drawing Sheets

DEVICE AUTHENTICATION AND ENCRYPTED COMMUNICATION SYSTEM OFFERING INCREASED SECURITY

This application is based on an application No. 10-043230 filed in Japan, the content of which is hereby incorporated by reference.

BACKGROUND OF THE INVENTION (1) Field of the Invention

The present invention relates to a device authentication and encrypted communication system. Secure data communication takes place between one of a plurality of user devices and a system device, after each device has confirmed the legitimacy of the other.

(2) Description of the Related Art

Generally speaking, ensuring the security of valuable data during data communication is a serious problem. When transferring such data, it is essential to confirm that the receiver device is legitimate. In addition, the data needs to be protected from interception or tampering by a third party while being sent on communication paths.

A typical example of the kind of data communication system that attaches great importance to ensuring security is an automatic highway toll collecting system using radio communication.

Automatic Highway Toll Collecting System

The following is an explanation of a hypothetical automatic highway toll collecting system based on current thinking.

In this automatic highway toll collecting system, payment of highway usage charges, or tolls, is made by radio communication between an onboard device installed in a vehicle and roadside devices located at each highway entrance and exit toll gate.

The onboard device uses a removable IC (Integrated Circuit) card. This functions as a prepaid card, on which balance information showing a certain sum of money is recorded.

At a highway entrance gate (hereinafter referred to as an entrance gate) an onboard device transmits an onboard device ID to a roadside device by radio. The roadside device then sends entrance information, including a gate ID, entrance time and the like, to the onboard device. The onboard device receives the entrance information from the roadside device and records it on the IC card.

Conversely, at a highway exit gate (hereinafter referred to as an exit gate) an onboard device transmits entrance information and balance information to a roadside device by radio. The roadside device then calculates the highway toll based on the received entrance information, subtracts the toll from the received balance information and updates the balance information. The updated balance information is then transmitted to the onboard device by radio.

It should be noted that the automatic highway toll collecting system is assumed to contain several million cars and several thousand roadside devices. Furthermore, radio communication between onboard devices and roadside devices is possible over a range of several tens of meters, so that vehicles having an onboard device do not need to stop at entrance or exit gates in order to pay tolls or similar. As a result, traffic congestion in the vicinity of such gates can be reduced.

This kind of automatic highway toll payment system would naturally need to achieve error-free high speed communication in order to operate successfully. However, the following security issues also need to be resolved.

Firstly, a roadside device must confirm that an onboard device is legitimate. A roadside device needs to recognize immediately that a communication from a bogus onboard device is fake, so that countermeasures, such as barring the gate or recording the numberplate of the offending vehicle while photographing the driver, can be taken.

On the other hand, the onboard device also needs to confirm that the roadside device is legitimate. Attempts to make illegal profit, occurring when a bogus roadside device communicates with an onboard device, need to be prevented. One example of such an attempt is altering the entrance information recorded inside the IC card, so that the toll paid is for a shorter distance than the actual distance traveled.

Furthermore, the content of radio communication between an onboard device and a roadside device must not be vulnerable to interception and misuse by a third party.

Ensuring Data Communication Security by Using Shared Secret Information

The above-mentioned security issues can be resolved by using widely-known device authentication and encrypted communication techniques when performing data transfer by radio between an onboard device and a roadside device.

For example, a certain secret key encryption algorithm and certain secret information may be shared between the onboard device and the roadside device. This secret information is conventionally known as an encryption key or a decryption key. If the secret key encryption algorithm and the secret information are shared between the onboard device and the roadside device, they can be used to perform mutual device authentication, to encrypt data before transmission and to decrypt data after reception.

Here, encryption and decryption based on a secret key encryption algorithm requires a comparatively smaller computational ability than a public key encryption algorithm, making high-speed processing possible. As a result, encrypted communication based on a secret key encryption algorithm is effective in an automatic highway toll collecting system that collects tolls automatically without requiring vehicles to stop.

However, since the automatic highway toll collecting system described above has a plurality of onboard devices, each must be provided with unique secret information. The reason for this is as follows. Assume that an onboard device A and an onboard device B have the same secret information. Should a third party somehow manage to obtain the secret information of onboard device A and use it to produce a bogus onboard device A', attempts to exclude bogus onboard device A' from the system by using a list will result in the simultaneous exclusion of the legitimate onboard device B.

Problems

Here, if the secret information differs for each onboard device, the question of how a roadside device is to obtain the secret information of every onboard device becomes a problem.

One possible method is to store information corresponding to the IDs and secret information of all of the onboard devices in advance in the roadside devices. However, if this method is used, updating the storage content of the several thousand roadside devices existing in the system is extremely troublesome. Also, the method has a weakness in that the secret information in all of the onboard devices will be exposed in the event of one of the roadside devices being analyzed by a third party.

Another method involves deriving the secret information for an onboard device from a secret function f in the onboard device ID. The value of this function f (ID) is recorded in the onboard device, and the roadside device possesses the same function, so that a method in which the roadside device receives notice of the onboard device ID, from which it then derives the secret information, can be envisaged. However, this method has a drawback in that, if a roadside devices is analyzed by a third party, the function f will be exposed, which results in the secret information in all of the onboard devices being compromised.

It should be noted that these problems are not peculiar to an automatic highway toll collecting system. Similar problems will also be apparent in any system in which the need to ensure security of data communication between one of a plurality of user devices and one of a plurality of system devices produces a system that requires secret data to be shared between user devices and system devices.

SUMMARY OF THE INVENTION

The present invention is designed to overcome the above problems, and relates to device authentication and encrypted communication occurring between a user device and a system device. The first objective or the invention is to provide a device authentication and encrypted communication system having a security function which maintains a high security level for communication even when illegal intrusion and analysis threaten the system device. Furthermore, when this kind of device authentication and encrypted communication uses encryption and decryption based on a secret key encryption algorithm, the second objective of the invention is to provide a key delivery method that delivers the key so as to prevent illegal intrusion and analysis of the system device.

A device authentication and encrypted communication system which achieves the above mentioned first objective is one comprising a plurality of user devices, a system device, and a control device, where device authentication and encrypted communication are performed between the plurality of user devices and the system device. Each of the plurality of user devices stores a piece of secret information that is unique to the user device. The control device produces pieces of key capsule data by performing a specified conversion on pieces of secret information of the plurality of user devices, provides each user device with a piece of key capsule data that has been produced from the piece of secret information stored in the user device, and provides the system device with a specified key that enables the system device to obtain pieces of secret information of user devices from pieces of key capsule data provided by the user devices. Then the user device transmits the piece of key capsule data received from the control device to the system device and the system device recovers the piece of secret information stored in the user device from the piece of key capsule data received from the user device using the specified key. During device authentication and encrypted communication between one of the user devices and the system device, the user device and the system device perform one of encryption and decryption according to a secret key encryption algorithm, using the piece of secret information that is unique to the user device as a key. The term "key capsule data" is equivalent to "encrypted key". The term symmetric is characteristic of a shared key encrypted communication system. The term asymmetric is characteristic of a public/private key system where the private key is not disclosed to another party.

Using this construction, a system device recovers unique secret information, which is different for each user device, from the key capsule data transmitted from a user device. As a result, device authentication and encrypted communication can take place with the user device without storing unique secret information and linked user device IDs for all of the user devices. Accordingly, the system device does not need to record unique secret information for all of the user devices. Therefore, even if an ill-intentioned third party manages to illegally invade and analyze the system device, they will not be able to obtain the unique secret information of the user devices.

Furthermore, in the device authentication and encrypted communication system, the control device stores, in advance, a signing key used in a digital signature conversion with message recovery method, and a corresponding verification key. The specified conversion is a digital signature conversion with message recovery made using the signing key. The specified key is the verification key. The system device obtains a piece of secret information from a piece of key capsule data, by performing a digital signature verification conversion with message recovery corresponding to the digital signature conversion with message recovery, using the specified key.

In the above construction, key capsule data is produced by a digital signature conversion with message recovery. As a result, even if the verification key, used for a signature verification conversion in this digital signature conversion with message recovery, is obtained from the system device by illegal intrusion or analysis, the signing key used in the signature conversion with message recovery cannot be derived from this verification key. Therefore, key capsule data cannot be forged by an ill-intentioned third party.

Furthermore, in the device authentication and encrypted communication system, device authentication is performed between one of the user devices and the system device, where one of the user device and the system device is a first device and another is a second device. The following procedures are used. The first device encrypts random data using the secret key encryption algorithm and sends the encrypted random data to the second device. The second device then receives the encrypted random data, decrypts the encrypted random data using the secret key encryption algorithm to produce response data, and sends the response data to the first device. The first device receives the response data and compares the response data with the random data.

Using the above construction, a system device shares unique secret information recovered from key capsule data with a user device. As a result, authentication of the legitimacy of a user device or a system device takes place using a challenge-response procedure based on a secret key encryption algorithm, which uses this unique secret information as a shared key. If authentication is successful, this confirms that the unique secret information has been correctly shared. Furthermore, if it is assumed, as mentioned above, that forgery of key capsule data by ill-intentioned persons is impossible, authentication which uses a challenge-response procedure to confirm the legitimacy of a user device has a high level of accuracy.

Furthermore, in the device authentication and encrypted communication system, the digital signature conversion with message recovery and the digital signature verification conversion with message recovery are based on elliptic curve theory.

In the above construction, the sharing of unique secret information allows the quantity of key capsule data transmitted from a user device to a system device can be reduced without lowering the security level of the system.

Furthermore, in the device authentication and encrypted communication system, the user device is an onboard device, installed in a vehicle and the system device is a roadside device, placed near a road. Data communication between the user device and the system device takes place when the user device passes in a vicinity of the system device.

Using the above construction, when one of a plurality of vehicles in which an onboard device is installed passes in the vicinity of a roadside device placed by a road, a secret key, the security of which is preserved, can be shared between the onboard device and the roadside device. Accordingly, device authentication and encrypted communication can take place between the onboard device and the roadside device using a secret key encryption algorithm for encryption and decryption. This takes place relatively faster than device authentication and encryption communication using a public key encryption algorithm, so traffic congestion occurring in the vicinity of the place where the roadside device is situated can be prevented.

Furthermore, in the device authentication and encrypted communication system, device authentication is a process in which the user device and the system device authenticate each other. In addition, encrypted communication between the user device and the system device takes place bidirectionally.

Using the above construction, the system device can confirm that the user device is a legitimate device, which has received key capsule data from a control center, and the user device can confirm that the system device is a legitimate device, which has received the verification key from the control center. In addition, data can be transmitted and received securely via a public communication channel.

Furthermore, in the device authentication and encrypted communication system each piece of secret information stored by each user device has been distributed by the control unit.

Using the above construction, the control center can produce key capsule data by performing a signature conversion with message recovery on unique secret information, before distributing the unique secret information to a user device. As a result, it is not necessary to provide the control center with a means for receiving unique secret information from a user device and a simple construction can be achieved.

Furthermore, in the device authentication and encrypted communication system, the control unit stores, in advance, a public key used in a public key encryption method, and a corresponding secret key. The specified conversion is a public key encryption conversion made using the public key and the specified key is the secret key. The system device obtains a piece of secret information from a piece of key capsule data by performing a decryption conversion corresponding to the public key encryption conversion, using the specified key.

Using the above construction, a system device can recover unique secret information using a secret key distributed from the control center. Therefore, it is not necessary to store unique secret information in all of the user devices in advance. If the unique secret information is not stored in advance, the unique secret information of all of the user devices cannot be exposed, even if a system device is illegally invaded and analyzed. As a result, the security level of the system is increased.

Furthermore, in a key distribution method, which achieves the second objective above, one out of a plurality of user devices, each of which stores different secret information, distributes secret information to a system device as a key to be used in device authentication and encrypted communication. The key distribution method comprises of the following steps. In a key capsule data production and distribution step, key capsule data is produced, by performing a digital signature conversion with message recovery on the unique secret information in each user device, and distributed to each user device. In a verification key distribution step, a verification key, used in a digital signature verification conversion with message recovery corresponding to the digital signature conversion with message recovery, is distributed to the system device. In a key capsule data transmission step, the key capsule data distributed by the key capsule data production and distribution step is transmitted to the system device by a user device. In a key recovery step, key capsule data transmitted by the key capsule data transmission step is received, and secret information is recovered from the key capsule data using the verification key distributed by the verification key distribution step.

Using the above processing structure, a system device can perform machine authentication and encrypted communication with all of the user devices, without needing to store unique secret information and linked user device IDs. Furthermore, even if the verification key of the signature verification conversion in the signature conversion with message recovery is illegally obtained by intrusion or analysis of a system device, the signing key used in the signature conversion with message recovery cannot be derived from this verification key. Therefore, an ill-intentioned third party cannot forge the key capsule data.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

The following is an explanation of an embodiment of the present invention, with reference to the drawings.

Construction

Figure 1:
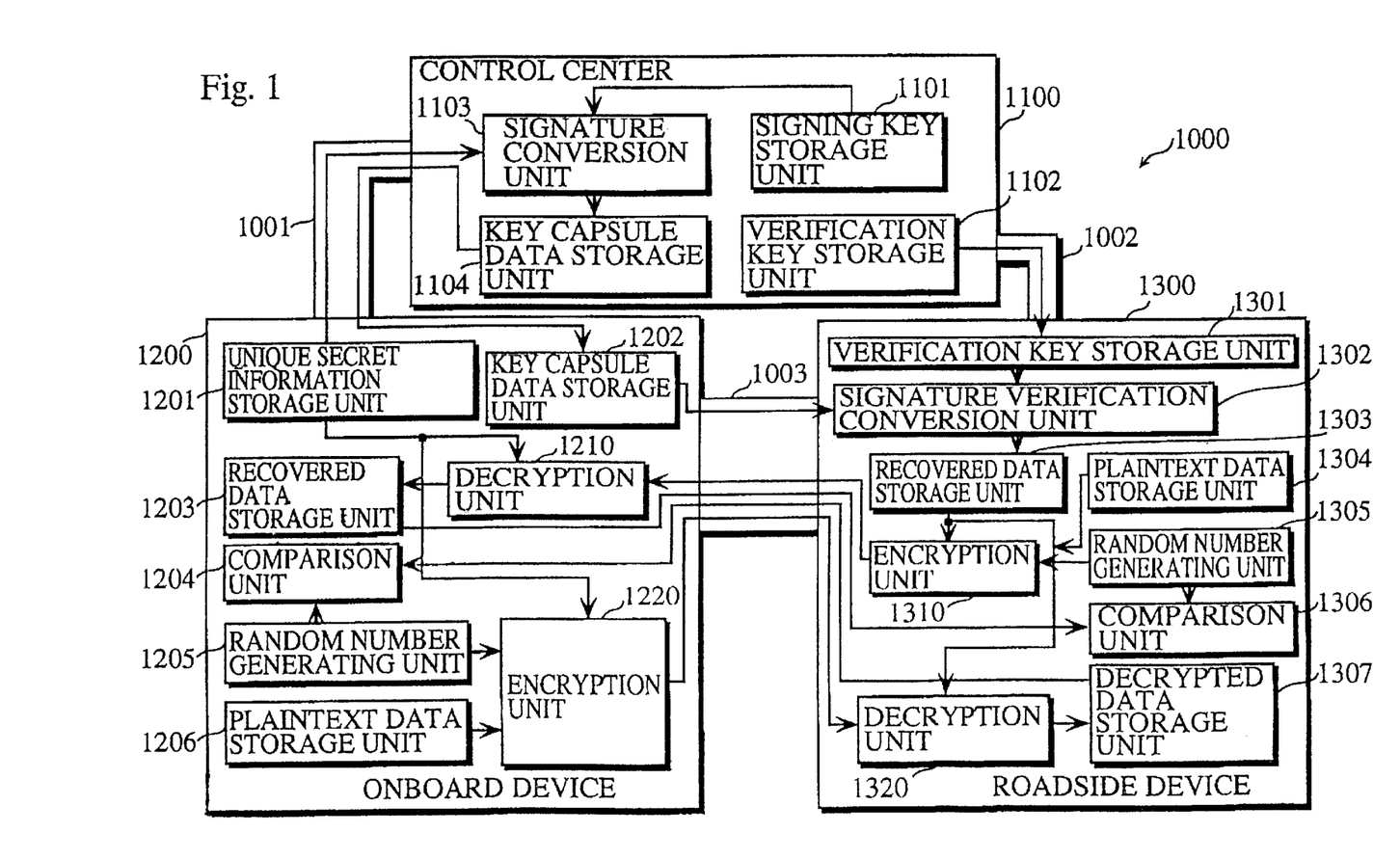
FIG. 1 is a block diagram showing the function of the main parts of an automatic highway toll collecting system 1000 relating to an embodiment of the present invention.

FIG. 1 is a block diagram showing the main functional blocks of an automatic highway toll collecting system 1000 relating to an embodiment of the present invention.

The automatic highway toll collecting system 1000 consists of one control center 1100, several million onboard devices and several thousand roadside devices. In the system, payment of highway tolls takes place by radio communication between onboard devices in vehicles and roadside devices placed at toll gates at each highway entrance and exit. As long as the distance between an onboard device and a roadside device is within several tens of meters, radio communication can take place even if the vehicle in which the onboard device is installed is in motion. This diagram focuses on the relationship between one onboard device 1200, one roadside device 1300 and a control center 1100.

Control Center 1100

The control center 1100 is a center for administering the legitimacy of all the devices within the system. The control center 1100 is composed of a computer which includes a memory and a CPU, and is capable of transmitting data secretly to the onboard device 1200 and the roadside device 1300 via secret communication channels 1001 and 1002. Here, secret communication channels 1001 and 1002 are communication channels having a high security capacity, which prevents data from being tapped or tampered with by a third party.

In terms of functions, the control center provides a signing key storage unit 1101, a verification key storage unit 1102, a signature conversion unit 1103 and a key capsule data storage unit 1104. These functions are realised by the memory or by the CPU executing control programs stored in the memory.

Here, the signing key storage unit 1101 is a memory area, which stores a signing key Sc, to be used when a digital signature is produced by an algorithm of digital signature with message recovery. The verification key storage unit 1102 is a storage area, which stores a verification key Vc corresponding to the signing key for verifying a digital signature.

The signature conversion unit 1103 receives onboard device secret information Ki that is unique to an onboard device (hereinafter referred to as 'unique secret information Ki') from the onboard device 1200 via the secret communication channel 1001 and, using the signing key Sc, performs a digital signature conversion with message recovery (hereinafter referred to as a 'signature conversion') on unique secret information Ki to produce key capsule data Ci. This signature conversion is described later.

Here, a key capsule data storage unit 1104 is a memory area, which stores the key capsule data Ci produced by the signature conversion unit 1103.

The control center 1100 also has communication control functions for controlling the following: reception of unique secret information Ki from the onboard device, transmission of key capsule data Ci stored in the key capsule data storage unit 1104 to the onboard device, and transmission of the verification key Vc stored in the verification key storage unit 1102 to the roadside device.

Onboard Device

The onboard device 1200 is installed in a vehicle and pays the highway tolls automatically by radio communication, via the public communication channel 1003, to a roadside device, such as 1300, placed at an entrance or exit gate of the highway. The onboard device includes standard computer components, like a CPU and a memory, and is also provided with a removable IC card. This card functions as a prepaid card, on which balance information showing a certain sum of money is recorded. Furthermore, the public communication channel 1003 is an insecure communication channel, so that data passing through it is at a high risk from tapping or tampering.

In terms of functions, the onboard device 1200 includes a unique secret information storage unit 1201, a key capsule storage unit 1202, a decrypted data storage unit 1203, a comparison unit 1204, a random number generating unit 1205, a plaintext data storage unit 1206, a decryption unit 1210 and an encryption unit 1220. These functions are realized by the memory or by the CPU executing control programs stored in the memory.

Here, the unique secret information storage unit 1201 is a memory area, in which the unique secret information Ki, which differs for each one of the several thousand onboard devices, has been stored in advance. The unique secret information Ki is used as a key to encrypt communication data such as balance information when communication data is exchanged between an onboard device and a roadside device.

The key capsule data storage unit 1202 is a memory storage area for storing the key capsule data Ci obtained from the control center 1100 via the secret communication channel 1001.

The decryption unit 1210 decrypts encrypted data received from the roadside device 1300 using unique secret information Ki stored in the unique secret information storage unit 1201 and a specified secret key encryption algorithm. The data obtained from the decryption is stored in a memory area specifically for this purpose, the decrypted data storage unit 1203.

The random number generating unit 1205 generates random data for performing device authentication using a challenge-response procedure. This challenge-response procedure is described later.

The comparison unit 1204 compares response data for device authentication sent from the roadside device 1300 with random number data generated by the random number generating unit 1205.

The plaintext data storage unit 1206 is a memory unit storing plaintext data for transmission to the roadside device. This data is data that has been read from the IC card provided in the onboard device 1206, such as balance information and an onboard device ID.

The encryption unit 1220 encrypts the random data generated by random data generating unit 1205 or the plaintext data stored in the plaintext data storage unit 1206. This procedure is implemented by means of a secret key encryption algorithm identical to that of the decryption unit 1210 using the unique secret information Ki stored in the unique secret information storage unit 1201.

The onboard device 1200 also has various communication control functions. Unique secret information Ki stored in the unique secret information storage unit 1201 is transmitted to the control center 1100 and key capsule data Ci received from the control center 1100. Key capsule data Ci, encrypted random data, encrypted plaintext data, and data stored in the decrypted data storage unit 1203 by the challenge-response procedure are then transmitted. This data is transmitted to the roadside device 1300 as response data and response data received from the roadside device 1300. All of the above procedures are controlled by the control functions.

Roadside Device

The roadside device 1300 is placed at a highway entrance or exit gate, and collects highway tolls automatically from an onboard device, such as 1200, using radio communication via a public communication channel 1003. This device includes a memory and a CPU.

In terms of functions, the roadside device 1300 includes a verification key storage unit 1301, a signature verification conversion unit 1302, a recovered data storage unit 1303, a plaintext storage unit 1304, a random number generating unit 1305, a comparison unit 1306, a decrypted data storage unit 1307, an encryption unit 1310, and a decryption unit 1320. These functions are realized by the memory or by the CPU executing control programs stored in the memory.

Here, the verification key storage unit 1301 is a storage area which stores the verification key Vc obtained via the secret communication channel 1002 from the control center 1100 so as to preserve its secrecy.

The signature verification conversion unit 1302 performs a digital signature verification conversion with message recovery (hereinafter referred to as a 'signature verification conversion) on the key capsule data Ci, sent from the onboard device via the public communication channel 1003, using the verification key Vi stored in the verification key storage unit 1301. In this way, the unique secret information is computed and stored in a memory area specifically for that purpose, the recovered data storage unit 1303. Here, the signature verification conversion corresponds to the signature conversion of the control center 1100.

The plaintext data storing unit 1304 is a memory area storing plaintext data, such as updated balance information, which is to be sent to the onboard device 1200. The random number generating unit 1305 generates random numbers for performing device authentication using the challenge-response procedure.

The comparison unit 1306 compares the response data for device authentication sent from the onboard device 1200 with the random data generated by the random number generating unit 1305.

The encryption unit 1310 encrypts the plaintext data stored in the plaintext data unit 1304 or the random number data generated by the random number generating unit 1305 by a is secret key encryption algorithm identical to that of the onboard device 1200, using the unique secret information stored in the recovered data storage unit 1303.

The decryption unit 1320 decrypts data sent from the onboard device 1200 by a secret key encryption algorithm identical to that of the encryption unit 1310, using the unique secret information stored in the recovered data storage unit 1303, and stores the decrypted data in a memory area specifically for that purpose, the decrypted data storage unit 1307.

Signature Conversion with Message Recovery

The signature conversion mentioned above may be performed using an elliptic curve NR (Nyberg-Rupple) signature algorithm, for example. The elliptic curve NR signature algorithm is one of the digital signature schemes recommended as a standard by the P1363 Working Group of the IEEE (Institute of Electrical and Electronics Engineers). A signed text is produced by performing a signature conversion on an original text using a signing key. If a verification conversion is then performed using a verification key the original text will be reproduced.

Elliptic Curve NR Signature Conversion

The following is an explanation of the elliptic curve NR signature conversion.

An elliptic curve is a set of points (x,y) on the (x,y) plane satisfying Equation 1, below.

$$y^2 = x^3 + ax + b \qquad \text{Eq.1}$$

In Eq.1., a, b, x, y are elements in GF (Galois Field) (p). a and b are constants, while p is a large prime number. The numbers represented by lowercase letters below show positive numbers less than p. Uppercase letters represent xy coordinates for points on the elliptic curve.

A point on the elliptic curve, which includes a prime factor of a large order, is selected as a base point Q. Here, an order n is the minimum positive number that gives Qn=G.

A decryption key s is a positive number less than n. A corresponding encryption key P represents coordinates for a point sQ. The original text to be signed is m.

| | |
|---|---|
| Signing key: | d |
| Verification key: | Q and P (=sQ) |

Here, verification key P can be easily calculated from signing key d but, on the other hand, calculating the signing key d from the verification keys P and C is extremely difficult when order n is a large number. This difficult problem is known as the 'Elliptic Curve Discrete Logarithm Problem' and is the foundation of the security offered by this signature method. By using a signature method based on the Elliptic Curve Discrete Logarithm Problem, the same level of security as in RSA (Rivest, Shamir, Adleman) encryption is guaranteed, even though a memory with a smaller number of bytes may be used. These signature methods are described in more detail in *Modern Encryption* by Tatsuaki Okamoto and H. Yamamoto, (pub. Sangyotoshohan, 1997).

Here, a large number, of about 160 bits for example, is selected as the specific value of p.

Furthermore, the signing key d explained here corresponds to the signing key Sc stored in the signing key storage unit 1101, and the verification keys P and Q correspond to the verification key Vc stored in the verification key storage unit 1102 of the control center 1100.

Signature Conversion

The signature conversion takes place in the following way.

| | |
|---|---|
| Step 1: | Generate a random number k. |
| Step 2: | Calculate W = kQ. Let the x coordinate for W be Wx. |
| Step 3: | c1 = Wx EXOR m |

Here, EXOR is an operator representing an exclusive OR for each bit.

| | |
|---|---|
| Step 4: | c2 = k − d · c1 (mod n) |
| Step 5: | Let (c1, c2) be a signature corresponding to the original text m. |

Signature Verification Conversion

The signature verification conversion takes place in the following way:

| | |
|---|---|
| Step 6: | Receive (c1, c2). |
| Step 7: | Calculate W = c1P + c2Q |
| Step 8: | Reproduce original text m by calculating c1 EXOR Wx |

The following process can be used to confirm that the result of Step 8 is m:

$$W = c1P + (k - d \cdot c1)Q$$
$$= c1P + kQ - c1 \cdot (dQ)$$
$$= kQ$$

Operation

The following is an explanation of an operation of an automatic highway toll collecting system 1000 with the above construction.

General Description

At a highway entrance gate, an onboard device transmits an onboard device ID to a roadside device by radio and a roadside device transmits entrance information, including gate ID and an entrance time, to an onboard device by radio. The onboard device receives the entrance information from the roadside device and records it in an IC card.

Conversely, at an exit gate, an onboard device transmits entrance information and balance information to a roadside device by radio. The roadside device calculates the highway toll based on the received entrance information, subtracts this amount from the balance information, updates the balance information and transmits the updated balance information back to the onboard device by radio.

Here, the explanation focuses on the relationship between the control center 1100, an onboard device 1200 and a roadside device 1300.

Distribution of the Verification Key

The control center 1100 transmits a verification key Vc stored in a verification unit 1102 to the roadside device 1300 via a secret communication channel 1002. The roadside device 1300 receives this verification key Vc and stores it in a verification key storage unit 1301.

Production and Distribution of the Key Capsule Data

Figure 2:
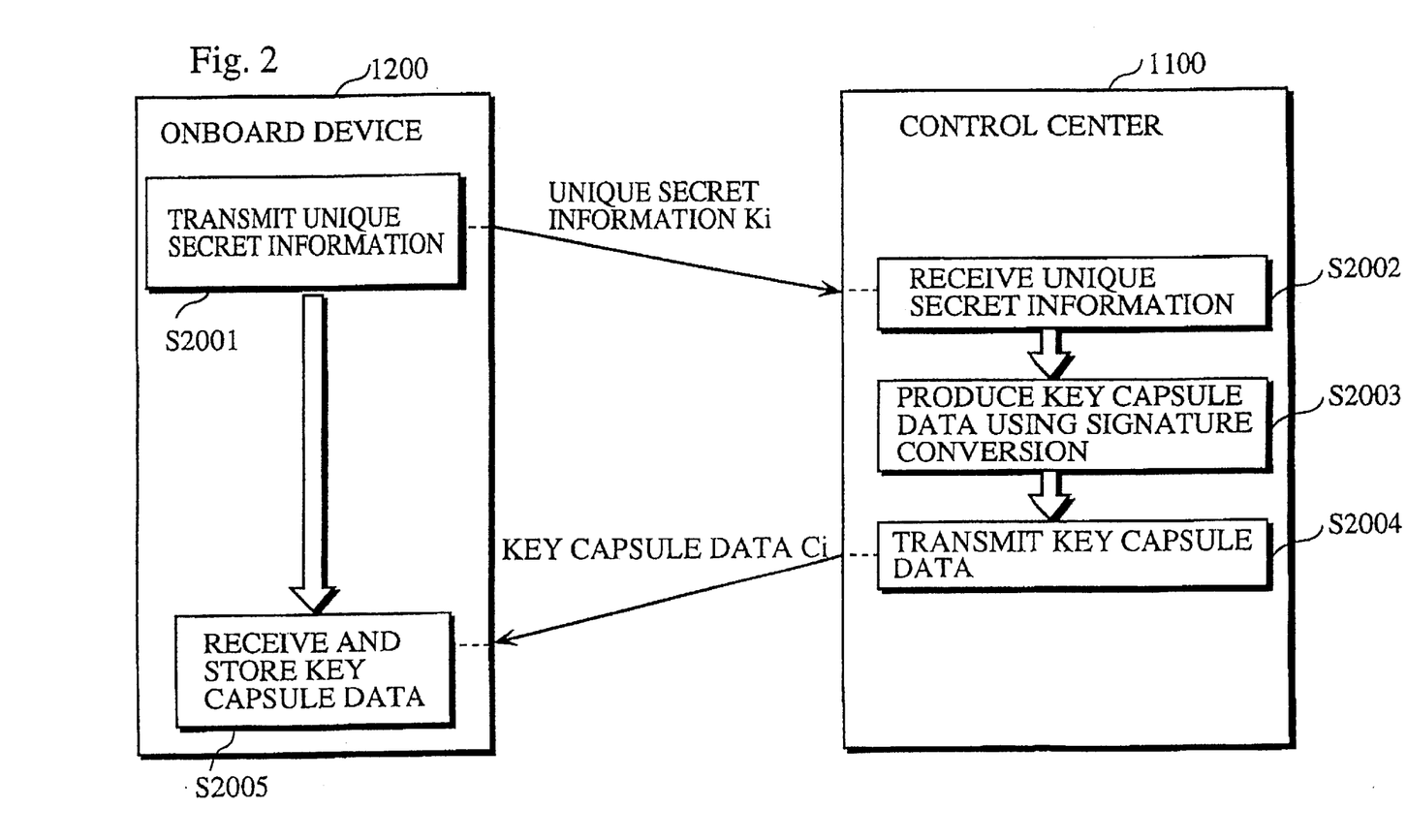
FIG. 2 is a diagram showing the production and distribution of key capsule data by a control center 1100 of the automatic highway toll collecting system 1000.

FIG. 2 is a diagram showing the production and distribution of key capsule data performed by control center 1100.

The onboard device 1200 transmits unique secret information Ki, stored in advance in the unique secret information storage unit 1201, to the control center 1100 via a secret communication channel 1001 (Step S2001).

The control center 1100 receives the unique secret information Ki from the onboard device 1200 (Step S2002). The signature conversion unit 1103 produces key capsule data Ci by performing the above-mentioned NR signature conversion on the unique secret information Ki using a signing key Sc stored in the signing key storage unit 1101. The key capsule data Ci is then stored in the key capsule data storage unit 1104 (Step S2003). Here, the key capsule data Ci corresponds to (c1, c2) mentioned in the above explanation of the NR signature conversion.

The control center 1100 then transmits the key capsule data Ci stored in the key capsule data storage unit 1104 to the onboard device 1200 via the secret communication channel 1001 (Step S2004).

The onboard device 1200 receives the key capsule data Ci transmitted from the control center 1100 and stores it in the key capsule storage unit 1202 (Step S2005).

The following is an explanation of the procedure for device authentication and encrypted communication, which take place between the roadside device 1300 and the onboard device 1200, assuming that the former is placed at an entrance gate and the latter is installed in a vehicle which has just arrived at the entrance gate. A state in which the distribution of the verification key and the production and distribution of the key capsule data described above have already been completed is an initial state for the start of this procedure. It should be noted that high-level security management has been in operation until this initial state has been reached, so that it is not possible to obtain verification key Vc using a bogus roadside device.

Figure 3:
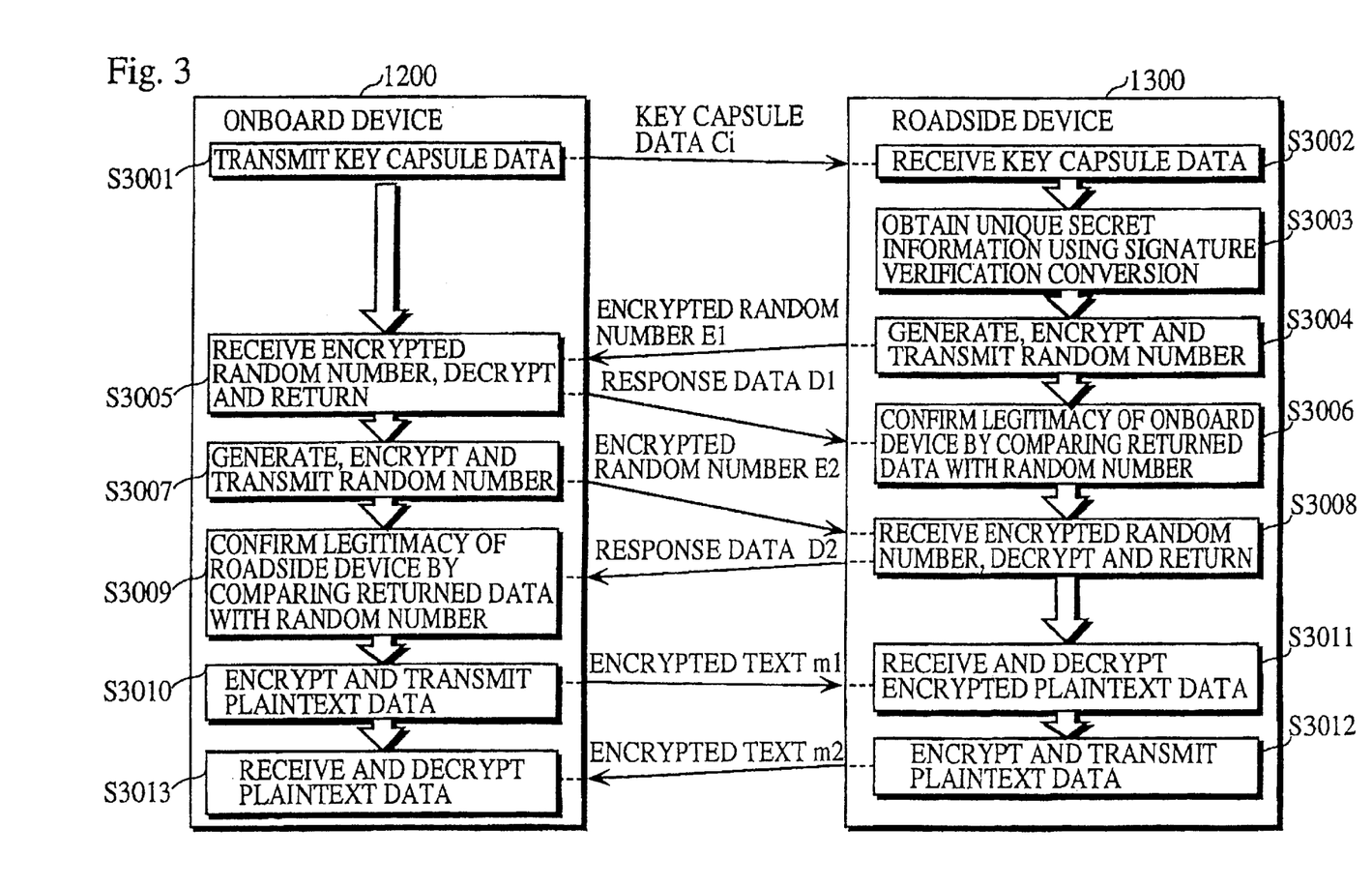
FIG. 3 is a diagram showing the operating procedure of an onboard device 1200 and a roadside device 1300 in the automatic highway toll collecting system 1000, when sharing secret information, performing device authentication, and encrypted communication.

Sharing of Secret Information and Procedures for Device Authentication and Encrypted Communication FIG. 3 is a diagram showing the operating procedures for sharing secret information, device authentication and encrypted communication performed between onboard device 1200 and roadside device 1300.

Sharing of Secret Information

The onboard device 1200 transmits the key capsule data Ci stored in the key capsule data storage unit 1202 to the roadside device 1300 via the public communication channel 1003 (Step S3001).

The roadside device 1300 receives the key capsule data Ci (Step 3002), and reads the unique secret information Ki', by performing the signature verification conversion explained above on this key capsule data Ci, using the verification key Vc stored in the verification key storage unit 1301. The unique secret information Ki' is then stored in the recovered data storage unit 1303. If the onboard device has transmitted legitimate key capsule data, the unique secret information Ki' stored in the recovered data storage unit 1303 and the unique secret information Ki stored in the unique secret information storage unit 1201 inside the onboard device 1200 will be the same. In other words, the secret information which is used thereafter to perform device authentication and encryption has been shared between the onboard device 1200 and the roadside device 1300.

Device Authentication

After receiving the unique secret information, the roadside device 1300 generates a random number R1 using the random number generating unit 1305. The encryption unit 1310 encrypts this random number R1 using the unique secret information Ki' stored in the recovered data storage unit 1303 as an encryption key. The data produced as a result of the encryption (hereinafter called 'encrypted random number E1') is transmitted to the onboard device 1200 via the public communication channel 1003 (Step 3004).

The onboard device 1200 receives the encrypted random number E1. The decryption unit 1210 accepts the encrypted random number E1 as an inputted encrypted text and decrypts it using the unique secret information Ki, stored in the unique secret information storage unit 1201, as a decryption key. The data produced as a result of this decryption (hereinafter called 'response data D1') is stored in the decrypted data storage unit 1203 and transmitted to the roadside device 1300 via the public communication channel 1003 (Step S3005).

Having received response data D1, the roadside device 1300 uses the comparison unit 1306 to compare response data D1 with the random number R1 generated in Step S3004 by the random number generating unit 1305 (Step S3006). If both numbers are found to be the same, the roadside device 1300 can judge that the onboard device 1200 is an legitimate device. In other words, if the numbers are the same, subsequent device authentication and encrypted communication processing can continue, but if not, onboard device 1200 is judged to be a bogus device. In this case, the processing shown in FIG. 3 is suspended and countermeasures, such as photographing the vehicle in which onboard device 1200 is installed, are taken.

Here, if the legitimacy of onboard device 1200 can be confirmed, the unique secret information Ki' stored in the recovered data storage unit 1303 and the unique secret information Ki stored in the unique secret information storage unit 1201 inside the onboard device can be assumed to be identical. Furthermore, the encryption algorithm of encryption unit 1310 can be assumed to correspond to the decryption algorithm of decryption unit 1210.

Thus the roadside device 1300 certifies the legitimacy of the onboard device 1200 by Steps S3004–S3006 above. Following this, the onboard device 1200 certifies the legitimacy of roadside device 1300 using the reverse process shown by the procedure below (Steps S3007–S3009).

The onboard device 1200 generates a random number R2 using the random number generating unit 1205. The encryption unit 1220 encrypts this random number R2 using the unique secret information Ki stored in the unique secret information storage unit 1201 as an encryption key. The data resulting from the encryption (hereinafter called 'encrypted random number E2') is transmitted to the roadside device 1300 via the public communication channel 1003 (Step S3007).

The roadside device 1300 receives the encrypted random number E2. The decryption unit 1320 accepts the encrypted random number E2 as an inputted encrypted text and decrypts it using the unique secret information Ki' stored in the unique secret information storage unit 1303 as a decryption key. The data produced as a result of this decryption (hereinafter called 'response data D2') is stored in the decrypted data storage unit 1307 and transmitted to the onboard device 1200 via the public communication channel 1003 (Step S3008).

Having received response data D2, the onboard device 1200 uses comparison unit 1306 to compare response data D2 with the random number R2 generated in Step 33007 by the random number generating unit 1205 (Step S3009). If both numbers are found to be the same, the onboard device 1200 can judge that the roadside device 1300 is an legitimate device. In other words, if the numbers are the same, subsequent encrypted communication processing can continue, but if not, roadside device 1300 is judged to be a bogus device. In this case, the processing shown in FIG. 3 is suspended.

The procedures explained here, namely, the procedure for transmitting and matching encrypted random number E1 and response data D1 to carry out device authentication, and the procedure for transmitting and matching random number E2 and response data D2 also to carry out device authentication, are so-called challenge-response procedures.

Encrypted Communication

After device authentication has been successfully completed, the onboard device 1200 stores the onboard device ID in the plaintext storage unit 1206. The encryption unit 1220 takes this onboard device ID stored in the plaintext data storage unit 1206 as a plaintext and encrypts It using the unique secret information Ki stored in the unique secret information storage unit 1201 as an encryption key. The resulting encrypted text m1 is transmitted to the roadside device 1300 via the public communication channel 1003 (Step S3010).

Having received the encrypted text m1, the roadside device 1300 decrypts encrypted text m1 using the unique secret information Ki' stored in the recovered data storage unit 1303 as a decryption key. The resulting decrypted data is stored in the decrypted data storage unit 1307 (Step S3011). As a result, roadside device 1300 is able to obtain the onboard device ID of onboard device 1200.

Furthermore, the roadside device 1300 stores entrance information in the plaintext data storage unit 1307. The encryption unit 1310 takes the entrance information stored in the plaintext data storage unit 1307 as a plaintext and encrypts it, using unique secret information Ki' stored in the recovered data storage unit 1303, as a encryption key. The resulting encrypted text m2 is transmitted to the onboard device 1200 via the public communication channel 1003 (Step S3012).

Having received the encrypted text m2, the onboard device 1200 decrypts encrypted text m2 using the unique secret information Ri stored in the unique secret information storage unit 1201 as a decryption key. The resulting decrypted data is stored in the decrypted data storage unit 1203 (Step S3013). As a result, onboard device 1200 is able to obtain the entrance information.

Although only the transmission and reception of data between the onboard device 1200 and the roadside device 1300 at an entrance gate has been described here, it should be noted that transmission and reception of data between the onboard device 1200 and a certain roadside device at an exit gate takes place using the same procedure as shown in FIG. 3.

Considerations

The following effects can be obtained by using the above automatic highway toll collecting system 1000.

Firstly, a roadside device can reconstruct individual secret information for each onboard device, the unique secret information, from key capsule data transmitted from an onboard device Therefore, onboard device IDs and unique secret information for all of the onboard devices do not need to be linked and stored in advance and thus the ability of roadside devices to repel ill-intentioned intrusions is increased due to the higher security level provided.

Secondly, secret data which is only known to a legitimate roadside device, the verification key Vc, is required for a roadside device to reconstruct the unique secret information. This enables the onboard device to confirm whether the roadside device is a legitimate device. As a result, illegal acts using bogus roadside devices can be prevented.

Thirdly, a signature conversion is used to produce the key capsule data. Therefore, even if a roadside device is illegally invaded and analysed, causing the control center verification key Vc to be compromised, the control center signing key Sc cannot be derived from the verification key Vc, and so key capsule data cannot be forged.

Lastly, a digital signature conversion method with message recovery conforming to the Elliptic Curve Discrete Logarithm Problem is used. This method preserves the same level of security as RSA encryption, while using less data.

Appendix

In the preceding explanation, an automatic highway toll collecting system 1000 is given as an example embodiment of a device authentication and encrypted communication system, relating to the present invention. However, the invention need not of course be restricted to this kind of embodiment. In other words:

(1) The device authentication and encrypted communication system relating to the present invention may be broadly applied to any system, such as for example a mobile telephone system, in which device authentication and encrypted communication are required between a plurality of user devices and one or a plurality of system devices. In the automatic highway toll collecting system 1000 shown in the embodiment, the onboard device corresponds to a user device, and the roadside device to a system device.

As one example, each user device is a memory card, a semiconductor memory with a storage capacity of several tens of megabytes and internal control circuits for device authentication and encrypted communication. The system device is a personal computer or similar device, used for reading encrypted data transmitted by a memory card and decrypting it. Each memory card holds unique secret information used as an encryption key for encrypting data, which is then outputted. However, since this kind of encryption is performed by a secret key encryption algorithm, which is comparatively simpler than a public key encryption algorithm, encryption of data and the like can take place at a rate sufficient for actual use, even when a small memory card with a low computation ability is used. In addition, if differing key capsule data corresponding to unique secret information is stored in advance by the control system in each memory card, it is impossible for key capsule data inside the memory card to be forged, even if the personal computer or similar device is analysed by a third party.

(2) In the automatic highway toll collecting system 1000 shown in the present embodiment, communication between an onboard device and a roadside device takes place by radio, but data communication between a user device and a system device in the present invention is not limited to radio communication.

Here, in the present embodiment, data communication between the control center and a user device or a system device takes place using a secure secret communication channel, but this secret communication channel need not be an electronic communication channel. Data exchange may take place via any device that is physically secure.

Furthermore, in the present embodiment, differing unique secret information is stored in advance in each onboard device. However, in a device authentication and encrypted communication system related to the present invention, a control center may produce different unique secret information for each user device in advance, and distribute this information to each user device along with the corresponding key capsule data.

(3) In the present embodiment, a digital signature with message recovery is used to produce the key capsule data. This means that the control center produces key capsule data, by using a secret key, the signing key, to perform a digital signature conversion with message recovery on the unique secret information. The system device then uses a public key, the verification key, to reconstruct the unique secret information from the key capsule data. However, even if a public key is used instead of the digital signature with message recovery, the system device need not store unique secret information for each user device in a way that corresponds to device identification numbers or the like, so that the first effect of the 'Considerations' above can still be obtained. When public key encryption is used, the control center may perform a public key encryption conversion on unique secret information for the user devices using the public key, to produce key capsule data, and then distribute this data to the user devices.

Furthermore, a secret key corresponding to the public key may be distributed to the system device in advance. The system device then uses the secret key distributed by the control center to read unique secret information from key capsule data transmitted by the user device, by performing a public key decryption conversion.

Furthermore, in the present embodiment, a digital signature with message recovery based on the Elliptic Curve Discrete Logarithm Problem is used. However, the third effect of the invention above may still be obtained if this is replaced with another digital signature with message recovery.

(4) In the present embodiment, the onboard device and the roadside device each perform device authentication on the other, but it is acceptable for only one of the devices to perform device authentication on the other.

Furthermore, in the present embodiment, an encrypted text m1 is transmitted from the onboard device to the roadside device and an encrypted text m2 from the roadside device to the onboard device. However, transmission need not be performed in this order, and it is not essential that transmission of encrypted text be a two-way process.

In addition, the operation need not be restricted to the example of a challenge-response procedure explained in the embodiment of the present invention, as long as device authentication takes place between a user device and a system device by performing encryption and decryption using shared unique secret information as a key. It is sufficient that the following procedure take place. Assume that one of either the user device or the system device is a device A, and that the other device is a Device B. Device A transmits a random number to Device B. Device B performs encryption on the received random number using unique secret information as a key and sends back the data produced by encryption to Device A. Device A then performs encryption on the random number previously transmitted to Device B using unique secret information as a key, and judges whether the data produced as a result of the encryption is identical to the data transmitted from Device B.

(5) A computer program for instructing a normal computer or a household electrical appliance capable of running programs can control the operating procedure of the control center, onboard device and roadside device of the automatic highway toll collecting system 1000 shown in the present embodiment (the procedure shown in FIGS. 2 and 3). This computer program may be recorded on a recording medium and distributed freely via various communication channels and the like. The recording medium concerned may be an IC card, an optical disk, a flexible disk, ROM (Read-Only Memory) or similar. The distributed computer program is readied for use by being installed in a device such as a household electrical appliance capable of running programs or a personal computer. The household electrical appliance or personal computer executes the computer program, realising functions related to the device authentication and encrypted communication of the present invention.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A device authentication and encrypted communication system comprising a plurality of user devices, a system device, and a control device, where device authentication and encrypted communication are performed between the plurality of user devices and the system device, according to a symmetric secret key encryption algorithm, wherein, each of the plurality of user devices stores a piece of secret information that is unique to the user device, and the control device:

(a) produces pieces of key capsule data by performing a specified conversion on pieces of unique secret information in each of the plurality of user devices, the unique secret information in each user device comprising a secret key for use in encrypted communication with that user device using a symmetric encryption algorithm;

(b) provides each user device with a piece of key capsule data that has been produced from the piece of secret information stored in the user device; and (c) provides the system device with a specified key that enables the system device to obtain pieces of secret information of user devices from pieces of key capsule data provided by the user devices, the user device transmits the piece of key capsule data received from the control device to the system device, the system device recovers the piece of secret information stored in the user device from the piece of key capsule data received from the user device using the specified key, and during device authentication and encrypted communication between one of the user devices and the system device, the user device and the system device perform one of encryption and decryption according to a symmetric secret key encryption algorithm, using the piece of secret information that is unique to the user device as a symmetric secret key.

2. The device authentication and encrypted communication system of claim 1, wherein:

the control device stores, in advance, a signing key used in a digital signature conversion with message recovery method, and a corresponding verification key;

the specified conversion is a digital signature conversion with message recovery made using the signing key;

the specified key is the verification key; and the system device obtains a piece of secret information from a piece of key capsule data, by performing a digital signature verification conversion with message recovery corresponding to the digital signature conversion with message recovery, using the specified key.

3. The device authentication and encrypted communication system of claim 2, wherein the device authentication is performed between one of the user devices and the system device, where one of the user devices and the system device is a first device and another is a second device, using the following procedures, (a) the first device encrypts random data using the secret key encryption algorithm and sends the encrypted random data to the second device;

(b) the second device receives the encrypted random data, decrypts the encrypted random data using the secret key encryption algorithm to produce response data, and sends the response data to the first device;

(c) the first device receives the response data and compares the response data with the random data.

4. The device authentication and encrypted communication system of claim 3, wherein the digital signature conversion with message recovery and the digital signature verification conversion with message recovery are based on elliptic curve theory.

5. The device authentication and encrypted communication system of claim 4, wherein the user device is an onboard device, installed in a vehicle;

the system device is a roadside device, placed near a road; and data communication between the user device and the system device takes place when the user device passes in a vicinity of the system device.

6. The device authentication and encrypted communication system of claim 5, wherein:

device authentication is a process in which the user device and the system device authenticate each other; and encrypted communication between the user device and the system device takes place bidirectionally.

7. The device authentication and encrypted communication system of claim 4, wherein:

each piece of secret information stored by each user device has been distributed by the control unit.

8. The device authentication and encrypted communication system of claim 1, wherein:

the control unit stores, in advance, a public key used in a public key encryption method, and a corresponding secret key;

the specified conversion is a public key encryption conversion made using the public key;

the specified key is the secret key; and the system device obtains a piece of secret information from a piece of key capsule data by performing a decryption conversion corresponding to the public key encryption conversion, using the specified key.

9. The device authentication and encrypted communication system of claim 8, wherein:

the user device is an onboard device installed in a vehicle;

the system device is a roadside device installed near a road; and data communication between the user device and the system device takes place when the user device passes in the vicinity of the system device.

10. A key distribution method, whereby one out of a plurality of user devices, each of which stores different secret information, distributes secret information to a system device as a key to be used in device authentication and encrypted communication, the key distribution method comprising:

a key capsule data production and distribution step, in which key capsule data is produced, by performing a digital signature conversion with message recovery on the unique secret information in each user device, and distributed to each user device, the unique secret information in each user device comprising a symmetric secret key for use in encrypted communication with that user device;

a verification key distribution step, in which a verification key, used in a digital signature verification conversion with message recovery corresponding to the digital signature conversion with message recovery, is distributed to the system device;

a key capsule data transmission step, in which the key capsule data distributed by the key capsule data production and distribution step is transmitted to the system device by a user device; and a key recovery step, in which key capsule data transmitted by the key capsule data transmission step is received, and secret information is recovered from the key capsule data using the verification key distributed by the verification key distribution step, the recovered key being used in encrypted communication between the user device and the system device according to a symmetric secret key encryption algorithm.

* * * * *